United States Patent Office 3,748,301
Patented July 24, 1973

3,748,301
PROCESS FOR MAKING A FRICTION ELEMENT AND POLYMERIC COMPOSITION
George A. Kuhar, Greensburg, Wallace R. Miller, Uniontown, and Anthony F. Finelli, Akron, Ohio, assignors to The Goodyear Tire & Rubber Company, Akron, Ohio
No Drawing. Continuation of application Ser. No. 399,911, Sept. 28, 1964. This application Jan. 14, 1970, Ser. No. 4,177
Int. Cl. C08f 1/86, 45/04, 45/18
U.S. Cl. 260—41 A        6 Claims

ABSTRACT OF THE DISCLOSURE

A composition having a specific gravity of about 1.2 to about 3 and a Rockwell R scale hardness of 40 to about 120, consisting essentially of a polymeric matrix having dispersed therein about 5 to 90% by weight of a mineral filler having a specific gravity greater than 1, the polymeric matrix comprising polymers of a liquid monomer selected from the class having the formula

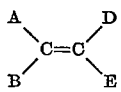

where A, B, D and E are selected from the group consisting of hydrogen, methyl and higher alkyl radicals and the halogens, phenyl, vinyl phenyl, alkoxy, carboxyl, acetate and nitrile. The filler, in addition to being a mineral filler, can also contain an appreciable amount of organic filler of the elastomeric polymers and related polymers usually in a quantity sufficient to double the viscosity of the liquid monomer.

---

This application is a streamlined continuation of application Ser. No. 399,911, filed Sept. 28, 1964, now abondoned.

This invention relates to a method of bulk polymerizing a liquid monomer having the structure

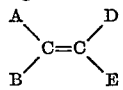

where A, B, D, E may be hydrogen, methyl and higher alkyl radicals, halogens, phenyl, vinyl phenyl, alkoxy, carbonyls, acetate and cyanide. More specifically, this invention relates to a method of polymerizing and copolymerizing acrylonitrile and/or other liquid monomers of the above formula containing uniformly dispersed therein fillers and to the polymerizate which contains the filler dispersed therein.

Polymers of acrylonitrile have been produced by solution polymerization and as a result the solvent has had to be removed by after processing steps. For some purposes it would be highly desirable to have a method for polymerizing acrylonitrile which would produce the acrylonitrile as a homogeneous mass. This has not been possible heretofore because polyacrylonitrile is insoluble in acrylonitrile and precipitates. Therefore, in view of the insolubility of polyacrylonitrile in acrylonitrile, the industry was faced with the problem of how to produce a polyacrylonitrile free of solvent which has a filler dispersed therein.

An object of this invention is to provide a method for polymerizing in the bulk a liquid monomer having the structure

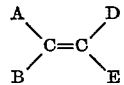

where A, B, D, E are the same as indicated above, to produce polymers thereof which have dispersed therein fillers to obtain compositions which may vary in density, hardness and impact strength.

In accordance with this invention a liquid monomer and/or monomers of the structure

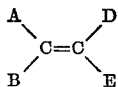

where A, B, D, E are the same as indicated above, is polymerized with an ionizing radiation. The polymerization can be performed in either a vertical or horizontal mold with the thickness of the mass generally being from about one-eighth to about 1 inch. It has been found that by using fillers which are soluble in acrylonitrile or which may be dispersed uniformly throughout to form essentially a paste, the acrylonitrile may be polymerized and copolymerized in bulk without the formation of bubbles and the resulting polymer composite may be made to vary in physical properties from extremely hard essentially rock-like substances to those which are essentially elastomeric in nature. Also, by polymerizing in either a vertical or horizontal mold it is possible to form the polyacrylonitrile in a sheet which may vary from about one-eighth to about one inch in thickness with the length and width dimensions being those desired within practical limits. Where the polyacrylonitrile contains fillers, it is possible to produce new polymerizates which are useful as insulating boards and which are also highly decorative and valuable for their esthetic effects.

The following examples illustrate the invention, all parts being by weight:

EXAMPLE I

A uniform mixture of 100 parts acrylonitrile and 60 parts of mica, which passed through a 160 mesh U.S. Standard Screen, was made vigorously stirring the ingredients of the mixture in a vessel having the air replaced with nitrogen until the finely divided mica becomes suspended in the acrylonitrile. Then the mixture was poured into a vertical aluminum mold 12″ x 12″ x ½″ coated with a silicone release agent.

The vertical aluminum mold containing the mixture of mica and acrylonitrile was placed in a radiation cell and was subjected at about 75° F. to 10 megarads of gamma radiation from a cobalt 60 source before being removed from the radiation cell. The aluminum mold was opened to disclose a marble appearing slab of solid polyacrylonitrile 12″ x 11″ x ½″ having mica dispersed therein and having a Rockwell R scale hardness of 90. Cubes 2″ x 2″ x ½″ were cut from the slab with a bandsaw and the cubes were subjected to burn testing at 6000° F. for 30 seconds in an arc image furnace. The char erosion on these cubes were 3.4 mils per second. Hence, this mica filled polyacrylonitrile was suitable for fabrication of rocket liners.

EXAMPLE II

Polymerization mixtures were prepared by Recipes A, B and C and these mixtures were placed in a vertical aluminum mold coated with a wax paste. Then the contents of the mold were subjected to radiation from a Cobalt-60 source for sufficient time to give the dosage shown. The arc image furnace burn rate was determined on the radiation polymerization product. The burn rate of these samples are shown in Table 1 relative to the radiation dosage.

TABLE 1

| Recipe | A | B | C |
|---|---|---|---|
| Acrylonitrile | 100 | 100 | 100 |
| Mica (160 mesh) | 60 | | |
| Wollastonite | | 120 | |

| Dosage, megarads | Burn rate on the polymer (mils/second) | | |
|---|---|---|---|
| 10 | 3.4 | | 11.1 |
| 25 | 5.0 | 4.3 | |
| 40 | 3.7 | | |

EXAMPLE III

A series of samples were made using the recipes shown in Table 2 and these samples were radiation polymerized at the radiation dosage indicated. The burn rate in mils/second and the Shore A hardness of the polymerized samples are also given in this table.

EXAMPLE IV

| Recipe R108X | 715 | 699-737 | 701 | 707 | 708 | 709 | 710 | 711 | 746 | 733 | 734 | 747 | 749 | 751 |
|---|---|---|---|---|---|---|---|---|---|---|---|---|---|---|
| Acrylonitrile | 100 | 100 | 100 | 100 | 100 | 100 | 100 | 100 | 100 | 100 | 100 | 100 | 100 | 100 |
| Copolymer #1 | | 11 | | 10.9 | 10.9 | 10.9 | 4.2 | 4.2 | 10.6 | | | 25 | 11.8 | 7.75 |
| Copolymer #2 | | | 11 | | | | | | | | | | | |
| Terpolymer #3 | | | | | | | | | | | 6.4 | | | |
| Mica | 50 | 50 | 50 | 49.8 | 49.8 | 49.8 | 19.3 | 19.3 | | 60 | | 60 | 45.5 | 39.5 |
| BL 353 | | | | 1.9 | | | | | | | | | | |
| Glass, ½″ staple | | | | | 20.8 | | | | | | | | | |
| Glass, ¼″ staple | | | | | | 20.8 | | | | | | | | |
| B₂O₃ | | | | | | | 62 | | | | | | | |
| Spodumene | | | | | | | | | 234 | | | | | |
| Talc | | | | | | | | | | | | 17 | | |
| Sand | | | | | | | | | | | | | 130 | |
| Borax | | | | | | | | | | | | | | |
| K₂CO₃ | | | | | | | | | | | | | | 95 |
| CaCO₃ | | | | | | | | | | 62 | | | | |
| EGDMA | | | | | | | | | | | 20.1 | | | |
| TMPTMA | | | | | | | | | | | | 20.1 | | |
| Physical properties | | | | | | | | | | | | | | |
| Compression modulus (p.s.i.×10⁻³) | 1.6 | 14-15 | 13 | 11.9 | 9 | 10.5 | 4.5 | 11.3 | 14.9 | 10.4 | 11 | 14.9 | 15 | 5.5 |
| Deflection (inches per inch) | .06 | .11 | .13 | .24 | .08 | .09 | .08 | .1 | .25 | .11 | .13 | .25 | .08 | .08 |
| Impact, notched izod (lbs./inch) | 2.0 | 2.3-3.1 | 3.4 | 3.3 | 4.8-25.5 | 4.6 | 1.9 | 1.9 | 2.0 | 1.4 | 1.03 | | 4 | 03 |
| Specific gravity at 20° C | 1.76 | 1.3-2.4 | 2.3 | 1.94 | 2.71 | 1.86 | 2.53 | 2.97 | 1.2 | 1.26 | 1.18 | 1.59 | 1.35 | |
| Rockwell hardness, R | 35-110 | 90-104 | 89-92 | 38-91 | 81-87 | 80-85 | 10-110 | 73-97 | 84 | 94-95 | 96-104 | 84 | 90 | 94 |

NOTE.—EGDMA is the abbreviation for ethylene glycol dimethacrylate; TMPTMA is the abbrevition for trimethylol propane trimethacrylate; BL 353 is N,N'-dinitroso-N,N'-dimethyl terephthalyl amide, which produced a porous adduct; Copolymer #1 is a rubbery copolymer of 33% acrylonitrile and 67% butadiene; Copolymer #2 is a 52% acrylonitrile, 48% butadiene rubbery copolymer; Trepolymer #3 is a #liquid terpolymer of -butadiene, -methyl acrylate, -methacrylic acid.

TABLE 2

| Recipe | D | E | F | G |
|---|---|---|---|---|
| Polyethylene adipate¹ | 300 | 300 | | 300 |
| Mica (325 mesh) | 90 | 90 | 180 | 90 |
| Acrylonitrile | 30 | 30 | 300 | 30 |
| Dicumyl peroxide | | 3 | | 90 |
| Sodium borate | | | | 90 |

| Recipe | Radiation dosage, megarads | Burning rate | Shore A |
|---|---|---|---|
| D | 3 | 4.1 | |
| | 66 | 3.0 | |
| | 136 | 2.9 | 87 |
| E | 2 | 4.1 | |
| | 66 | 3.1 | |
| | 136 | 2.8 | 87 |
| F | 5-10 | 3.8 | 90 |
| G | 40 | 3.3 | 90 |

¹ 2,000 molecular weight.

When acrylonitrile is radiation polymerized in relatively thick sections, i.e. sections ½ to 1½ inches thick, problems are experienced with heat dissipation. This difficulty may be overcome by the use of a high boiling diluent comprising polymeric materials soluble in the acrylonitrile. A solution of these polymeric materials in acrylonitrile together with suitable fillers permits polyacrylonitrile products to be obtained which have a wide range of properties as illustrated by the values set forth below:

| | |
|---|---|
| Specific gravity | 1.20->3.0 |
| Notched izod | 2.0-25.5 |
| Compression, p.s.i. | 4,500-19,000 |
| Deflection | 0.04-0.29 |
| Rockwell hardness, R Scale | 40-120 |

Where fillers such as cork is used, the specific gravity may be as low as about 0.5 as well as up to about 0.8. The cellulosic filled products will generally have a specific gravity of less than 1. On the other hand, the non-cellulosic filled products may be less than one or greater than one with the mineral fillers giving the product most generally a specific gravity greater than one.

Hence, it is possible to obtain compositions having essentially a polyacrylonitrile matrix which envelopes the fillers which may be of either the organic or inorganic type or their combinations. By varying the ratio of inorganic to organic fillers it is possible to obtain compositions which vary from as hard as marble to those essentially elastomeric in nature.

This is further illustrated by Example IV where the recipes are based on 100 parts of acrylonitrile:

EXAMPLE V

A grinding wheel was prepared by forming a slurry of the following composition:

| | |
|---|---|
| Carborundum medium grit powder | 200 |
| Ground limestone | 30 |
| Acrylonitrile | 57.2 |
| Styrene | 14.3 |
| Ethylacrylate | 14.3 |

A copper bushing for a grinding wheel was positioned centrally within a 4-inch diameter ointment can. Then a sufficient amount of the well-mixed slurry was added to the can to fill it to the depth of its bushing. The slurry was subjected to radiation at 0.07 megarad/hour until the total dosage was 5.45 megarads. This radiation polymerized the olefinic material of the slurry to form a hard grinding wheel which performed very satisfactorily in service.

The amount of filler in the grinding element may vary widely: from a few percent, say about 10%, up to about 90%, depending on specific use and shape of the friction element. For instance, where the friction element is a belt or flat fabric sheet then the amount of filler may be in this range. Where the belt is either paper or fabric the slurry may be applied to the outer periphery thereof and then be polymerized to form the sandpaper or an endless belt of sandpaper.

Example VI shows how to make compositions useful as brake linings.

EXAMPLE VI

A slurry or paste was made by mixing the ingredients of the following recipe:

| | |
|---|---|
| Asbestos, short fibers | 11 |
| Brass, fine chips | 25 |
| Lead, powder | 2 |
| Barium sulfate | 5 |
| Ethylene glycol dimethacrylate | 4 |
| Diatomaceous earth | 5 |
| Copper, powder | 2.5 |
| Silicon carbide | 2.5 |
| Acrylonitrile | 3 |
| 55/45% butadiene/acrylonitrile rubber | 0.5 |

The slurry paste was mixed and molded under a vacuum to degas the slurry. The molded paste in the shape of a brake band was cured by exposure to a radiation dose of 10 megarads. The cured brake band had a coefficient of friction of 0.4 to 0.75, low fade and a wear rate of 0.006 inch per test and was evaluated as a suitable brake lining.

Although the above recipe is only exemplary, those skilled in the brake or friction art know that these elements usually comprise on a weight basis 10 to 80% of a matrix material, 50 to 10% of fillers, 20 to 5% of wear-modifying agents and 20–5% of lubricants.

Representative examples of the wear-modifying agents known to the friction element art are the phosphides of cobalt, copper, iron, manganese, molybdenum, nickel, titanium and tungsten, silicon carbide; powdered metals of copper, lead tin, zinc, soft alloys such as bronze and brass. Molybdenum disulfide and graphite are frequently used as lubricants.

To further illustrate the preparation of friction elements the data of Example VII is set forth:

EXAMPLE VII

The formulations of Table 3 were prepared by mixing the fillers, abrasion materials and binders in a twin shell blender for two hours. Test specimens were formed by molding at 75° F. in a press at 30,000 pounds per square inch, unless other pressures are indicated. The specimens were in the shape of one inch squares.

During molding some of the liquid monomer was squeezed out, therefore the formulations reported in Table 3 have been corrected for monomer lost during press molding. The green molded friction elements have sufficient strength to permit their removal from the mold and to be placed in position for irradiation. Also, for simplicity the amount of monomer and other ingredients added to the green uncured friction elements are reported as percentages of the filler master batch, which had the following composition (parts by weight basis):

| | |
|---|---|
| Asbestos, short fiber | 110 |
| Brass, chips | 125 |
| Barium sulfate | 50 |
| Lead powder | 20 |
| Diatamaceous earth | 50 |
| Copper powder | 25 |
| Silicon carbide | 25 |

TABLE 3

| Composition, percent by weight | | | | Radiation dosage, megarads | Research dynamometer total wear, inches × 10⁻³/100 stops |
|---|---|---|---|---|---|
| FMB | EGDMA | AN | Other | | |
| 80 | 20 | | | 20 | ¹ 27 |
| 91 | 9 | | | 17 | ² 22 |
| 91 | 4.5 | 4.5 | | 17 | ² 23 |
| 96.75 | 2.75 | | 0.5 NBr | 18 | 26 |
| 96.95 | 1.43 | 0.25 | Vinyl acetate 1.37 | 50 | 20 |
| 97.25 | 2.34 | 0.41 | | 50 | 27 |
| 91 | 9 | | Lignin 1.25 | 15 | ² 37 |
| 89.6 | 8.9 | 1.5 | | 1 | ³ 15 |
| 90.5 | 8.87 | 0.13 | NBr 0.5 | 16 | ² 33 |
| 69.7 | 8.87 | 0.13 | Brass chips 20.3 | 16 | ² 6 |

¹ Molded 10,000 p.s.i.
² Molded 20,000 p.s.i.
³ Molded 15,000 p.s.i.
NOTE.—FMB is abbreviation for filler master batch; EGDMA is abbreviation for ethylene glycol dimethacrylate; AN is abbreviation for acrylonitrile; NBr is abbreviation for acrylonitrile butadiene rubber.

A laminate of the polymeric composition to other representative materials, for example, pressboard, plywood, metals such as iron, aluminum, copper, bronze, other alloys, glass, ceramics and elastomers of the polyolefinic type such as the conjugated dienes, is readily obtained in accordance with the teachings of this invention, as may be seen from the horizontal molding of Example VIII.

EXAMPLE VIII

Waxed spacer bars were clamped above the edges of a plywood sheet to form a cavity mold. Then the mold cavity was filled with a mixture of 100 parts acrylonitrile, 11 parts rubbery copolymer of 33% acrylonitrile and 67% butadiene and 50 parts of mica. The mixture in the cavity on the plywoood sheet was subjected to gamma radiation from a Cobalt-60 source to polymerize the mixture in the cavity. The spacer bars were removed to leave a plywood laminate having a composition on one face thereof having a Rockwell R hardness of about 90 to 104.

Where it is desired to produce compositions having a thickness greater than one inch, several castings may be made using the same mold. For instance, the top surface of the composition on the plywood or a cellulosic sheet is cleaned and then another casting is made using the top surface as the bottom of the mold. Consequently, a laminate is built up having two or more layers.

The surface of the laminated composition usually is cleaned to remove the releasing agent, which may be wax, with methyl ethyl ketone and then polishing the surface with a wire brush. By the use of a cover material such as the commercial polyester film, Videne, or a polyethylene film, the need to clean the surface may be eliminated.

Where it is desired that the composition have a smooth or glossy surface, highly polished mold plates such as chromeplated steel, pumice-polished sheet aluminum, shiny aluminum foil or plate glass should be used.

A grainy effect is achieved by using mica as a filler whereas sand gives a tridimensional particulate design. A wide range of colors, grain effects and visual textures are achieved by using different fillers and coloring agents. Since polyacrylonitrile has a natural opacity, it may be more efficiently dyed by sprinkling the inorganic dyes and pigments on the surface of the casting rather than mixing into the mixture per se.

In another modification of this invention instead of adding the organic filler it is possible to make a mixture of monomers and their polymers or copolymers by radiation initiation or chemical means, for example, peroxides or persulfates to give a mixture containing some monomer(s) and sufficient polymer or copolymer to thicken the mixture. This technique of prepolymerization reduces both heat evolution and shrinkage in the subsequent in-mold polymerization thereby facilitating the production of larger shaped articles without explosions or other defects associated with excessive heat generation.

In general sufficient filler, preferably of the organic polymer type, is present in the liquid monomer to at least double the viscosity of the monomer. This is easily accomplished by prepolymerizing the monomer to obtain a mixture containing from about 20 to about 50% polymer, before subjecting the monomer-polymer mixture to ionizing radiation. This combination of chemical prepolymerization technique with ionizing radiation permits larger masses to be polymerized with less heat distortion and may even be a mere economic procedure.

EXAMPLE IX

Sponge or porous material suitable for insulation was made by subjecting the following mixtures of Table 4 to 12.8 megarads of radiation:

TABLE 4

| Receipt No. | 1 | 2 | 3 | 4 | 5 | 6 |
|---|---|---|---|---|---|---|
| Vinylidine chloride ¹ | | | | | 500 | 500 |
| Ethyl acrylate ¹ | 500 | 200 | 80 | 900 | | 500 |
| Acrylonitrile ¹ | 500 | 800 | 920 | 100 | 500 | |
| Ammonium acetate | 200 | 200 | 200 | 200 | 200 | 200 |
| Boric acid | | | | | | |
| Nature of polymer | Hard | Hard | Hard | (²) | Hard | Hard |

¹ Present as parts per volume.
² Soft, flexible.

The compositions numbered 1 to 6 of Table 4 were placed in a vacuum oven at about 210° F. for about 2 hours. This vaporized the ammonium acetate to leave a porous composition which varied from hard to a soft porous sponge. Other readily vaporizable or water soluble fillers may be used to obtain porous compositions when removed from the reaction product.

The preferred organic fillers are those which dissolve or as a 10% dispersion do not settle out of the acrylonitrile on standing at 75° F. for 10 minutes. Some suitable organic fillers are polymers or copolymers of vinyl acetate, vinylidine chloride, styrene, alkyl methacrylates, alkyl acrylates and esters either saturated or unsaturated. Also, polyolefins such as polylbutadiene, polyisoprene, polyethylene and polypropylene, as well as polytetramethylene glycol ether, polypropylene glycol ether may be used as additives.

Other representative organic and inorganic fillers are perlite, vermiculite, fly ash, metal chips, metal powders, cellulosics, wood flours, lignin, cork, metal oxides, polyamides, salts, such as the alkali and alkaline earth carbonates and sufates, clays, silicas and silicate minerals. The amount of filler used may vary over a wide range depending upon the desired product. Thus, for some uses as little as 5% fillers may be used and in other cases it may be as high as about 90%, although in those cases where the specific gravity is to be greater than one with most fillers more than 50% will be needed.

The polymerization is readily effected by use of 0.5 up to 50 megarads of ionization radiation with about 1.5 to 15 megarads being preferred. Those experienced in radiation techniques realize that the type of radiation to be chosen will be determined, in most cases, by the depth of penetration desired.

The term "ionizing radiation" denotes radiation which has at least sufficient energy to produce ions or break chemical bonds, and includes radiation both in the form sometimes regarded as particle radiation, such as electrons and protons, and in the form sometimes regarded as ionizing electro-magnetic radiation, as for example, X-rays and gamma rays. Although both types of radiation usually produce somewhat similar effects, the utility of each varies depending on the physical characteristics of the article to be irradiated and other factors.

The unit of radiation referred to as the "rad" represents that amount of radiation which will impart 100 ergs per gram of material and is related to other radiation units such as the "rep" by well known conversion factors. For convenience, radiation dosages are expressed in terms of millions of "rads" or "megarads."

The use of an inert atmosphere in the mold during the polymerization results in the polyacrylonitrile being insoluble in dimethylformamide while the presence of oxygen gas tends to produce a soluble polyacrylonitrile. For instance, a polyacrylonitrile prepared by irradiation acrylonitrile held in a vacuum with 5 megarads of gamma radiation was only about 10% soluble in dimethylformamide. A further advantage of polymerization under a vacuum is the reduction in the number of bubbles, and pits present in the surface of the polymer.

Since one of the problems experienced with polymerization in bulk is shrinkage of the mass, it is a preferred practice to use molds which are elastic about the shrinkage face. For instance, when making a sheet according to the procedure of Example VIII a rubber bar makes an excellent spacer bar and gives a product free of shrinkage distortion.

While certain representative embodiments and details have been shown for the purpose of illustrating the invention it will be apparent to those skilled in this art that various changes and modifications may be made therein without departing from the spirit or scope of the invention.

What is claimed is:

1. A method of making a friction element comprising forming a mixture on a weight basis of about 10 to 80% of a matrix material, about 50 to 10% of a filler, about 20 to 5% of a wear-modifying agent and about 20 to 5% of a lubricant, forming said mixture into the shape of the friction element and polymerizing with about 0.5 to 50 megarads of ionizing radiation the olefinic material of the matrix material to form the composition of the friction element, said matrix material comprising a liquid monomer selected from the class consisting of acrylonitrile, and a mixture of acrylonitrile with a monomer having the formula

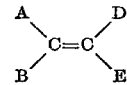

where A, B, D and E are selected from the group consisting of hydrogen, methyl, higher alkyl radicals, the halogens, phenyl, vinyl phenyl, alkoxy and acetate.

2. The method of claim 1 wherein the wear-modifying agent is selected from the class consisting of phosphides of cobalt, copper, iron, magnesium, molybdenum, nickel, titanium, and tungsten, silicon carbide, powdered metal of copper, lead, tin, zinc and soft alloys, and the lubricant is selected from the class consisting of molybdenum, disulfide and graphite.

3. A composition having a specific gravity of about 1.20 to 3.0 and a Rockwell R scale hardness of 40 to about 120 consisting essentially of a polymeric matrix having dispersed therein about 5 percent to 90 percent by weight but a sufficient amount of a mineral filler having a specific gravity greater than 1 to give the composition the recited specific gravity, said polymeric matrix comprising polymers formed by polymerization with about 0.5 to 50 megarads of ionizing radiation of a liquid monomer selected from the class consisting of acrylonitrile, and a mixture of acrylonitrile with a monomer having the formula

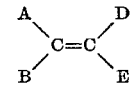

where A, B, D and E are selected from the group consisting of hydrogen, methyl, higher alkyl radicals, the halogens, phenyl, vinylphenyl, alkoxy and acetate.

4. The composition of claim 3 wherein the filler is selected from the class consisting of inorganic salts, finely divided silicate minerals, finely divided metals and metal oxides.

5. The composition of claim 3 wherein the liquid monomer is acrylonitrile.

6. The composition of claim 3 wherein in addition to the filler sufficient organic polymer is added to the liquid monomer prior to polymerization to at least double the viscosity of the monomer, said organic polymer being one which does not settle in 10 minutes at 75° F. from a 10 percent by weight dispersion of the organic polymer in acrylonitrile.

References Cited

UNITED STATES PATENTS

| | | | |
|---|---|---|---|
| 2,245,203 | 6/1941 | Kuzmick | 106—36 |
| 2,688,774 | 9/1954 | Malinowski et al. | 260—41 AG |
| 3,156,666 | 11/1964 | Pruett | 260—41 A |
| 3,180,845 | 4/1965 | Knudsen et al. | 264—211 |
| 3,183,208 | 5/1965 | Jurgeleit | 260—41 |
| 3,211,689 | 10/1965 | Darby | 260—41 A |
| 3,494,774 | 2/1970 | Bray | 106—36 |
| 2,881,156 | 4/1959 | Pilar et al. | 260—41 R |
| 2,921,006 | 1/1960 | Schmitz et al. | 204—159.22 |
| 3,272,772 | 9/1966 | Russell | 260—41 R |
| 2,921,006 | 1/1960 | Schmitz et al. | 204—159.22 |

OTHER REFERENCES

Metal Filled Plastics, Delmonte, Rheinhold Publishing Corp., 1961, pp. 30–33.

ALLAN LIEBERMAN, Primary Examiner

U.S. Cl. X.R.

260—17.4, 41 B, 41 R; 204—159.22